Patented Feb. 6, 1940

2,189,132

UNITED STATES PATENT OFFICE 2,189,132

PROCESS FOR PRODUCING PHENOL-CELLULOSE RESIN

Leon E. Champer and Leo M. Christensen, Atchison, Kans., assignors to The Chemical Foundation, Incorporated, New York, N. Y., a corporation of Delaware No Drawing. Application April 13, 1937, Serial No. 136,603

1 Claim. (Cl. 260—10)

This invention relates to the manufacture of synthetic resins, more particularly to the production of resins of a light color, from cheap, readily available starting materials.

The commercial development of synthetic resins, although very extensive, nevertheless has been retarded considerably by their high price. Such products have a very wide potential field of use and are employable to a much greater extent than at present if the cost of production could be materially reduced.

The recent developments in the art represent attempts, not only to improve such synthetic resins, but also materially to lower the cost by producing them from cheap materials. In accordance with this desire, therefore, it has heretofore been suggested to produce thermo-setting plastics by reacting phenol with cheap vegetable material, such as pentosans, to produce a sugar type resin. Similarly, it has been proposed to produce a synthetic resin by reacting phenol with cheap carbohydrate material such as cellulose.

According to the prior suggestions for the production of a phenol-cellulosic resin, relatively high temperatures and acid concentrations were recommended. Following the instructions of the prior art, a thermo-setting plastic could be produced. This particular plastic, however, compares very closely to the sugar type resins produced from pentosans, or equivalent material, and phenol.

We have now found as a result of further experimentation that these novel, light colored, thermo-setting plastics may be produced when utilizing relatively high acid concentrations, provided the temperature is maintained at a predetermined, relatively low, value. When operating under the principles of the present invention and maintaining low temperature conditions during reaction, the improved light colored resin is produced. This resin is a different product from that produced from the same starting materials but at the high temperatures recommended by earlier workers in the art.

The reactions involved in the production of the new product are scarcely susceptible of precise definition. It is believed, however, that a different type of condensation reaction takes place. It is believed that in the older type of prior art products, in which high acid concentrations and high temperatures were maintained, a marked hydrolysis of the cellulose obtained with the resulting formation of sugars. In these circumstances, it is probable that the phenol then reacted with the sugars, formed in situ, to produce a sugar type of resin.

In the present operation, on the other hand, from material available, it is clear that a different type of interaction takes place, for the reaction products are physically different from the earlier products. It is believed that in the present method a true cellulose-phenol resin is produced. Since the temperatures are maintained at a relatively low value, hydrolysis or degradation of the cellulose is commensurately diminished, thus permitting, it is believed, a linkage between the phenol and the hydroxyl groups of the cellulose, rather than through the aldehydic or ketonic groups. In this respect, it has been observed that the products produced according to the present invention physically, and physico chemically are more related or analogous to the alcohol type of resin than to the earlier phenol-cellulose resins of the prior art. While the foregoing is proposed as a possible logical rationale of the reaction, it is to be clearly understood that it is not presented as defining the exact mechanism of the process. It is a fact, however, that the products produced when operating according to the present invention are different and distinguishable, by physical tests, from earlier products in the art.

It is to be observed, initially, that when cellulose and phenol, or lignin and phenol, are heated in the presence of hydrochloric acid, to temperatures in excess of 100° C., no reaction takes place. However, if the temperature is materially lowered, down to between approximately 60° C. and approximately 80° C., and this temperature is held for a certain period of time, reaction is initiated and is completed after several days. As a result of this reaction, a very light colored, soluble, fusible resin is formed. It is believed that when phenol and cellulose, or lignin, are contacted with hydrochloric acid in this low temperature range, reaction is slowly initiated and then becomes autocatalytic.

According to the present invention, therefore, improved synthetic resins may be produced by reacting carbohydrate material such as cellulose, ligno-cellulose, and the like, with appreciable quantities of hydrochloric acid but under carefully controlled thermal conditions. It has been found, specifically, that the products produced according to the disclosure of the earlier application referred to, may be prepared by operating under low temperature conditions but with a substantial concentration of the catalyst, that is to say, with from substantially one per cent. to five or more per cent. of the catalyst, based on the phenol. In these circumstances, the desired light colored resinous product is produced.

As illustrating the practice under the invention 37.5 grams of concentrated hydrochloric acid are added to 750 grams of phenol, and to this phenol-catalyst mixture gradually are added 400 grams of cellulose. The mixture is maintained at a temperature of between 60° C. to approximately 80° C. for a period of four days, at which time a reaction is complete. In these circumstances, it will be observed that a reaction is evident after about twenty-four hours. When the reaction begins, the conditions within the reaction zone should be regulated to prevent an excessive rise in temperature, and for this purpose typical cooling methods may be utilized, to maintain the temperature within the desired range.

After completion of the reaction, the excess phenol is removed from the resinous product in any suitable manner, as for example, by steam distillation at about 190° C. or less, or by vacuum distillation at temperatures of the order of 160° C. In these circumstances about 350 parts of unreacted phenol is recovered. This material, as is known to those skilled in the art, may be re-employed in the process.

The initial or A-stage resin which is thus produced is substantially acid free. This product may be poured into shallow pans or molds and allowed to cool. The product is of a very light amber color, is fusible, and is soluble in typical alcoholic, ketonic and other organic solvents. It is found that the melting point of the initial resin can be varied and regulated, by suitable modification of the final distillation temperature.

It is to be observed that the products which may be produced under the present invention are not limited to cellulose or lignin as a starting material. The starting material may be news print, sawdust, cereal straws, vegetable fibers, and the like.

Similarly, in lieu of phenol, its homologues may be employed.

In place of hydrogen chloride as the catalyst, other halogen acids or halogen compounds may be employed in equivalent concentrations. Thus, in lieu of hydrogen chloride, sodium hypochlorite may be employed, in concentrations equivalent (in chlorine) to the hydrogen chloride catalyst disclosed above.

The initial product produced is amenable to the treatments usual in the art. This initial product may be converted to the C-stage, or infusible and insoluble modification by the application of heat and pressure. The initial product is therefore available for employment directly or for the production of laminated and moulded products in the manner known in the art. The initial product may be neutralized and milled, preferably in the plastic state, with a suitable filler, such as wood flour, asbestos, and the like. After solidification, the resulting product may be polymerized or transferred to the C-stage by heating to a temperature of 160° C., or more and under pressures of the order of 1000 lbs. per square inch, more or less.

If desired, the initial or A-stage resinoid may be dissolved in a suitable solvent and, while in the liquid phase, may homogeneously be incorporated with the filler material. After uniform mixing the solvent may be evaporated and recovered and the resin-filler mixture may then be polymerized and set to the infusible, ultimate, moulded form.

It will be understood that the novel resins, producible according to the present invention, may be utilized with other materials to modify the physical and chromatic characteristics of the ultimate product. Thus the initial resin may be admixed or incorporated with polymerizable oils, other polymerizable synthetic resins, natural resins, hardening agents, plasticizers, pigments, and the like, so as to produce a final resin of the desired physical characteristics.

While preferred modifications of the invention have been described, it is to be understood that these are given merely to explain the principles involved, and not as limiting the process, or the products produced therefrom to the particular embodiments mentioned.

We claim:

A process of producing synthetic resins, which comprises, reacting 750 parts by weight of phenol, containing from substantially one percent to substantially five percent of hydrochloric acid, with 400 parts by weight of cellulose, at temperatures of between substantially 60° C. and substantially 80° C. for substantially four days to insure the formation of a light-colored soluble, fusible resin; removing excess phenol and polymerizing the residual material to a C-stage resin at temperatures of substantially 160° C. at a pressure of substantially 1000 pounds per square inch.

LEON E. CHAMPER.
LEO M. CHRISTENSEN.